Oct. 17, 1944.   W. J. MATTOX   2,360,358
MANUFACTURE OF ETHYL BENZENE
Filed Feb. 11, 1942   2 Sheets-Sheet 1

INVENTOR
WILLIAM J. MATTOX
BY
ATTORNEY

Patented Oct. 17, 1944

2,360,358

UNITED STATES PATENT OFFICE 2,360,358

MANUFACTURE OF ETHYL BENZENE

William J. Mattox, Chicago, Ill., assignor to Universal Oil Products Company, Chicago, Ill., a corporation of Delaware Application February 11, 1942, Serial No. 430,503

2 Claims. (Cl. 260—671)

This invention relates to a process for producing monoethylbenzene from benzene and ethylene.

In the alkylation of benzene with ethylene to produce monoethylbenzene there is simultaneously produced relatively large quantities of polyethylbenzenes. These products in general are less desirable and have a lower market value than the monoethylbenzene because of the demand for the latter in the production of styrene which is useful as a raw material for manufacture of high molecular weight polymers and synthetic rubber.

In one specific embodiment my invention comprises alkylating benzene with ethylene, separating monoethylbenzene, subjecting polyethylbenzene to a dealkylation treatment to produce monoethylbenzene, separating and recovering the monoethylbenzene, returning a portion of unconverted polyethylbenzenes to the dealkylation treatment, and returning a portion of the liquid hydrocarbons boiling below monoethylbenzene to the dealkylation step and another portion together with ethylene to the alkylation step.

Figure 1:
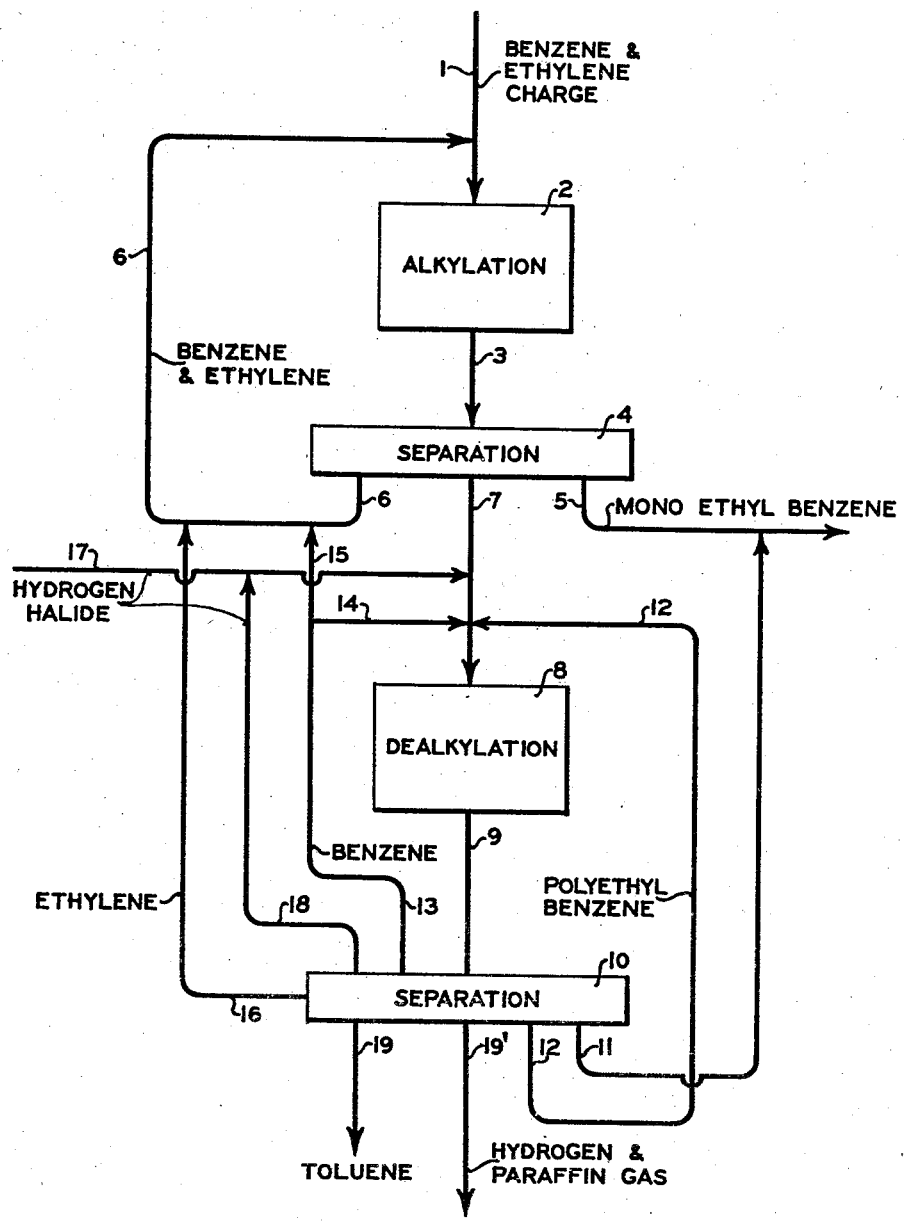
Figure 2:
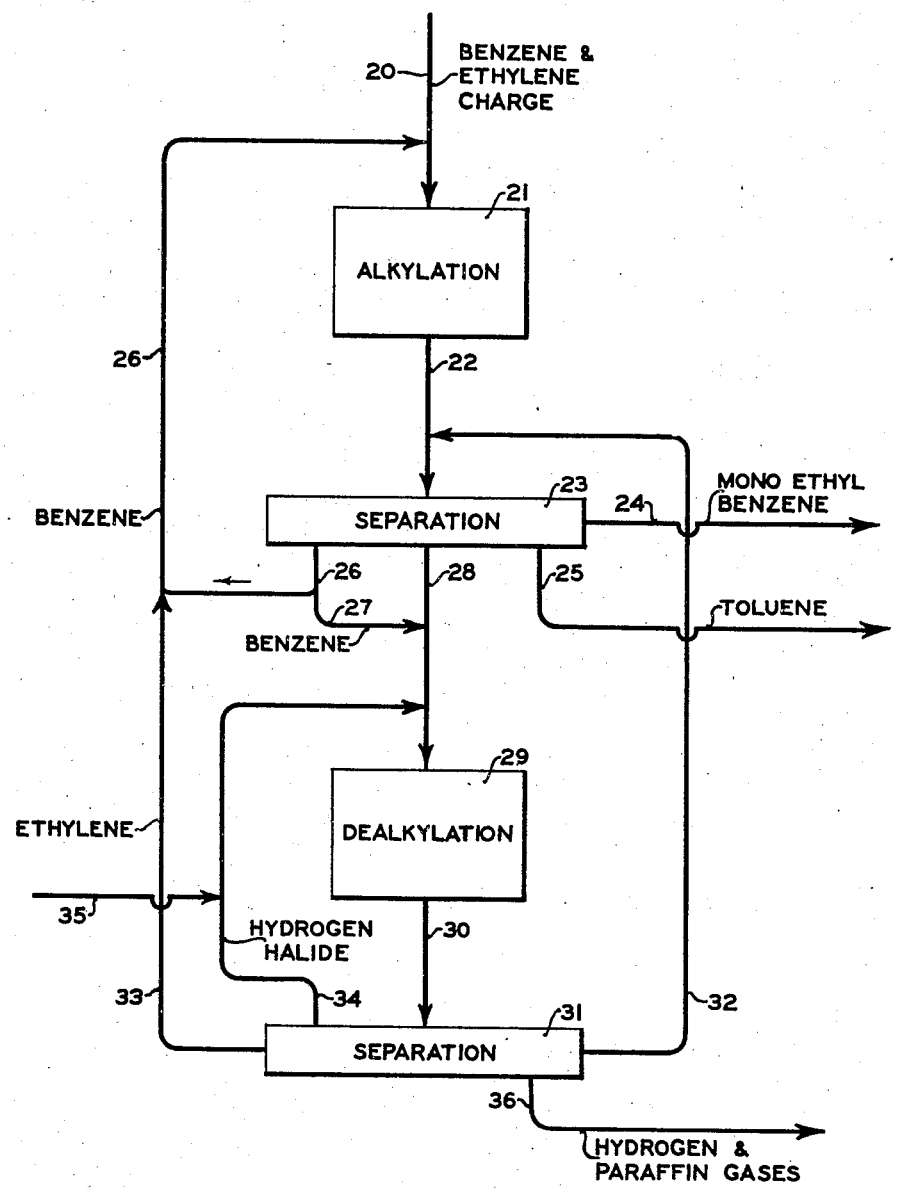

The invention may be understood by reference to the accompanying Figure 1 and Figure 2 which are diagrammatic and should not be interpreted as limiting it to the exact conditions shown therein.

Referring to Figure 1, benzene and ethylene are introduced through line 1 to alkylation step 2. The alkylated products pass through line 3 to separation step 4. Monoethylbenzene is removed through line 5. Unconverted benzene is returned to the alkylation step through line 6 together with reaction products hereinafter described. Polyethylbenzenes pass from separation step 4 through line 7 to dealkylation step 8 wherein the polyethylbenzene is partially dealkylated to monoethylbenzene. The reaction products pass through line 9 to separation step 10. Monoethylbenzene is removed through line 11 to storage. Polyethylbenzenes are recycled through line 12 to dealkylation step 8. Normally liquid material boiling below monoethylbenzene is passed through line 13 and a portion of it is returned to the dealkylation step through line 14. The remaining portion passes through line 15 joining with line 6 and is supplied to the alkylation step 2. Ethylene formed in the reaction due to the dealkylation of polyethylbenzene passes through line 16 joining with line 6 and is thus returned to the alkylation step 2. When employing my preferred dealkylation method using an alumina-containing catalyst and hydrogen halide, in zone 8, the hydrogen halide is introduced through line 17 to the dealkylation step. The hydrogen halide recovered from separation step 10 is recycled through line 18.

Since a small amount of toluene is a valuable by-product in this process, it is desirable to remove it from separation step 10 through line 19. Hydrogen and noncondensible gas may be removed through line 19'.

Another modification of the process is shown in Figure 2. According to this modification benzene and ethylene are introduced through line 20 to alkylation step 21. The alkylated products pass through line 22 to separation step 23. Monoethylbenzene is recovered through line 24. Toluene may be recovered through line 25. The light fraction comprising mainly benzene may be removed through line 26 to the alkylation step. At least a part of this fraction passes through line 27 joining with the polyethylbenzenes in line 28 and is passed to dealkylation step 29. The fraction removed through lines 26 and 27 may comprise all of the hydrocarbons boiling below monoethylbenzene. However, when substantial quantities of toluene are formed it is desirable to separately recover this valuable product. The reaction products from the dealkylation step 29 pass through line 30 to separator 31. All of the liquid products are supplied through line 32 to separation step 23 whereby the monoethylbenzene produced in dealkylation step 29 may be recovered and the unconverted material may eventually be recycled to the dealkylation step.

Separation step 23 comprises one or more fractionation steps whereby the products may be separated as indicated. Ethylene may be separated from separator 31 through line 33 joining with line 26 and this is returned to the alkylation step 21. When hydrogen chloride is used in the dealkylation step, as it is in my preferred operation, it is recycled through line 34. Makeup hydrogen halide may be added through line 35.

In some cases wherein hydrogen halides are used in alkylation step 21 (as when using certain Friedel-Crafts catalysts), a mixture of ethylene and hydrogen halide may be passed through lines 33 and 26 to alkylation step 21.

The alkylation step 21 may be carried out using any suitable well-known process, for example, catalytic processes using catalysts of the Friedel-Crafts type such as aluminum chloride, zinc chloride and the like, preferably in the presence of hydrogen chloride. Another and preferred type of catalyst is phosphoric acid which has been mixed with a suitable silicious material such as diatomaceous earth and calcined. It is ordinarily desirable to maintain a molecular excess of benzene in the alkylation zone in order to improve the yield of monoethylbenzene over the polyethylbenzene. According to procedures in which a maximum amount of monoethylbenzene is formed, high ratios of benzene, for example, 10-20 parts of benzene to 1 of ethylene and even higher, are used. It is an advantage of my process that one may use lower ratios of benzene to ethylene since the polyethylbenzenes formed are eventually converted into monoethylbenzene. Ratios of from approximately 1 to about 5 mols of benzene to 1 of ethylene are satisfactory for the alkylation step when using my process.

The dealkylation step 20 may be carried out using a silica-alumina, silica-alumina-zirconia, silica-zirconia, silica-alumina-thoria, etc., type of synthetic catalyst composite which is prepared by the separate or simultaneous precipitation of the silica and the added metal oxide.

The preferred operation comprises treating the polyethylbenzenes plus some of the low boiling fractions of benzene and the like with an alumina or alumina-containing catalyst in the presence of an added hydrogen halide. I have found that this process will selectively remove one or more ethyl groups from polyethylbenzenes such as diethylbenzene, to yield substantial quantities of monoethylbenzene and ethylene.

Since substantial quantities of toluene are also formed in the dealkylation step this may be recovered as a valuable by-product.

The amount of liquid hydrocarbons boiling below ethylbenzene which is recycled may vary. The use of 1 mol or more of this fraction per mol of polyethylbenzene processed in the dealkylation step, is often helpful in securing increased production of monoethylbenzene and decreased production of less desirable by-products.

When using Friedel-Crafts type catalysts in the alkylation step, a mixture of ethylene and hydrogen halide may be returned directly to the alkylation step.

According to my preferred operation, however, hydrogen halide is separated in a suitable recovery system and may be recycled to the dealkylation step.

The dealkylation step of my preferred operation may be carried out using alumina such as the activated alumina of commerce or any other type of alumina except the inactive alpha, beta, or delta forms of anhydrous aluminum oxide. For example, hydrated aluminum oxides may be calcined under controlled conditions to form gamma alumina which is a suitable catalyst. The hydrogen halide is preferably hydrogen chloride but may also under some conditions be hydrogen fluoride, hydrogen bromide or hydrogen iodide.

In addition to alumina, I may use composites of alumina, for example, silica-alumina and the like. Moreover, bauxite or other natural alumina-containing earths may be used, preferably after calcination.

Temperature conditions in the dealkylation step range from approximately 400-700° C. at space velocities usually less than about 20 and preferably about 0.2 to about 5 when using a temperature within the range of approximately 450 to about 650° C.

Subatmospheric, atmospheric, or superatmospheric pressures may be employed. Ordinarily temperatures in excess of 100 pounds per square inch are not required.

This step of the invention requires correlation of temperature, pressure, and space velocity to bring about a maximum conversion of the polyethylbenzene to monoethylbenzene and to minimize destructive side reactions.

The following example is given to illustrate my invention but should not be construed as limiting it to the exact conditions shown therein.

When operating according to my invention using a solid phosphoric acid catalyst for the alkylation of benzene with ethylene, a temperature of about 200 to 400° C. may be used. A temperature of 275° C. is satisfactory. A 4:1 ratio of benzene to ethylene is employed. The pressure may be 900 pounds per square inch. The dealkylation step was carried out using a gamma alumina catalyst prepared by calcining activated alumina obtained from the Aluminum Ore Company at about 550° C. until no further water was evolved. A mixture of approximately equimolecular quantities of hydrogen chloride and polyethylbenzene was contacted with this catalyst at about 550° C. and atmospheric pressure. The reaction products were fractionated together with the reaction products from the alkylation step. A ratio of about 3 mols of benzene to 1 mol of polyethylbenzene was maintained in the dealkylation step. The ethylene was returned to the alkylation step. A total yield of 95.6 molal per cent of monoethylbenzene based on the ethylene charged was obtained from this combination process. This compares with the production of only 80 molal per cent monoethylbenzene based on the ethylene, when using the best operation for alkylation alone. The yield of monoethylbenzene from this combination process is 15 mol per cent more than is obtainable by alkylation alone.

I claim as my invention:

1. A process which comprises subjecting benzene in admixture with ethylene to alkylation, separating resultant conversion products into a monoethylbenzene fraction and a polyethylbenzene fraction, subjecting the latter fraction to dealkylation in the presence of a catalyst comprising alumina and hydrogen chloride to form additional monoethylbenzene, benzene and ethylene, and supplying benzene and ethylene thus formed to the alkylating step.

2. A process which comprises subjecting benzene in admixture with ethylene to alkylation, separating resultant conversion products into a monoethylbenzene fraction and a polyethylbenzene fraction, subjecting the latter fraction to dealkylation in the presence of a catalyst comprising alumina and a hydrogen halide to form additional monoethylbenzene, benzene and ethylene, and supplying benzene and ethylene thus formed to the alkylating step.

WILLIAM J. MATTOX.